FIG.4.

Aug. 4, 1970  H. MILLER  3,522,729
AIRSPEED COMMAND SYSTEM
Filed Jan. 22, 1968  5 Sheets-Sheet 5

A — POWER — $V_{RF}$ — $V_2$
B — $V_1$ DECISION
C — ROTATE
D — LIFT OFF
E — LANDING GEAR RETRACT
F — CLIMB SPEED CAPTURE
G — ACCELERATED
H — FLAPS RETRACT
I — END TAKE-OFF POWER

FIG.5.
TAKE-OFF MANEUVER

A — ENTER HOLD PATTERN ($V_{RF}$ = 1.5 $V_S$)
B — LEAVE HOLD PATTERN ($V_{RF}$ = 1.5 $V_S$)
C — ENTER APPROACH PATTERN ($V_{RF}$ = 1.5 $V_S$)
D — APPROACH FLAPS ($V_{RF}$ = 1.4 $V_S$)
E — START FINAL FLAPS ($V_{RF}$ = 1.3 $V_S$)
F — GLIDE SLOPE CAPTURE
G — FLARE
H — TOUCH DOWN

FIG.6.
APPROACH & LANDING MANEUVER

FIG.7.
GO-AROUND MANEUVER

A — START GO-AROUND (TAKE-OFF POWER)
B — LANDING GEAR RETRACT
C — GO-AROUND FLAPS
D — GO-AROUND TARGET SPEED CAPTURE
E — ACCELERATE
F — FLAPS RETRACT
G — END TAKE-OFF POWER

INVENTOR.
HARRY MILLER
BY
J.C. Richards 3,522,729
AIRSPEED COMMAND SYSTEM
Harry Miller, Scottsdale, Ariz., assignor to Sperry Rand
  Corporation, a corporation of Delaware
Filed Jan. 22, 1968, Ser. No. 699,638
Int. Cl. G01c 23/00
U.S. Cl. 73—178                                6 Claims

ABSTRACT OF THE DISCLOSURE

Integrated airspeed computer and command display apparatus for aiding an aircraft pilot in controlling aircraft speeds during critical takeoff, approach, landing and go-round phases of aircraft operation wherein the following air-speed command functions and displays are provided:
  (a) Elevator commands for take-off, climb-out and go-around are displayed as a flight director pitch command,
  (b) Computation and display of a reference airspeed relative to the actual airspeed under various flight conditions and aircraft configurations,
  (c) Airspeed error display adjacent to the flight director command bars for indicating the error between a computed speed command and the actual airspeed,
  (d) Airspeed error commands to control an automatic throttle control system during approach and landing to automatically maintain a gust-compensated stall margin program without requiring manual adjustment for flap position and/or gross weight changes, and
  (e) Computation of aircraft gross weight.

The fundamental relationships that govern the system are based on the longitudinal aerodynamic balance of the aircraft as a function of airspeed, angle of attack, and flap position, these relationships being implemented and generated from measurable flight parameters of Pitot-static presures, pitch and roll attitude, and flap position.

BACKGROUND OF THE INVENTION

The present invention relates to an integrated airspeed control, command and display system particularly useful in aiding the pilot during the critical take-off, climb-out, let-down, approach, landing and go-around maneuvers. In each of these modes, the aerodynamic configuration of the aircraft undergoes a number of changes affecting its lift characteristics and hence its airspeed requirements, for example, landing gear retraction and extension, flap retraction ad extension, gross weight changes, engine operation, etc. In order to ease the pilot's burden during these configuration changes, the system automatically computes and displays a reference airspeed which reflects a predetermined margin above stall, this margin being programmed in accordance with flap position. The computation is performed in part by analog apparatus contained within the airspeed display instrument, the latter providing an indication of the error between the actual speed of the craft and the programmed stall margin speed. In other of its aspects, the indicator provides this error as an output for controlling a command display or flight director instrument or an automatic throttle system. Provision is also made for the automatic or manual insertion of a reference airspeed bias for compensating for the effects of wind gusts.

During the take-off mode of operation, a pitch command is provided by the pitch pointer of a flight director which, when followed by the pilot, will result in an optimum rotation, lift-off and climb-out. Provision is made for compensating for the loss of thrust from an engine during this critical maneuver. Also during this mode, a fast-slow display adjacent to the pitch command indicator is provided for advising the pilot of the error between the set reference speed ($V_2$) and the actual speed. The same form of command is employed during the go-around mode. Because of the control used during take-off and go-around whereby deviation from the preset airspeed is proportional to flight patch angle, the display on the fast-slow indicator is also equal to flight path angle during take-off and go-around.

SUMMARY OF THE INVENTION

Thus, the present invention relates to an airspeed command system which embodies the concept of computing and displaying a reference airspeed for an aircraft operating under a plurality of flight conditions and aircraft configurations which is automatically adjusted in accordance with a predetermined stall margin program as a function of flap position thereby relieving the pilot of the task of making airspeed adjustments with changing aircraft configurations. In another aspect, the invention embodies the concept of displaying any difference between the reference airspeed and the actual airspeed as a pitch command on a flight director instrument such that the aircraft may be controlled to maintain said stall margin program or other predetermined reference airspeed. In still another of its aspects, the invention includes the concept of computing a measure of aircraft gross weight from parameters including those required for generating the stall-margin program.

The invention will be described in connection with the accompanying drawings wherein.

FUNDAMENTAL RELATIONSHIPS

The speed command system of the present invention is based on certain fundamental relationships derived from the steady state aerodynamic balance of an aircraft in the longitudinal plane. Such a balance is illustrated diagrammatically in FIG. 1.

Figure 1:
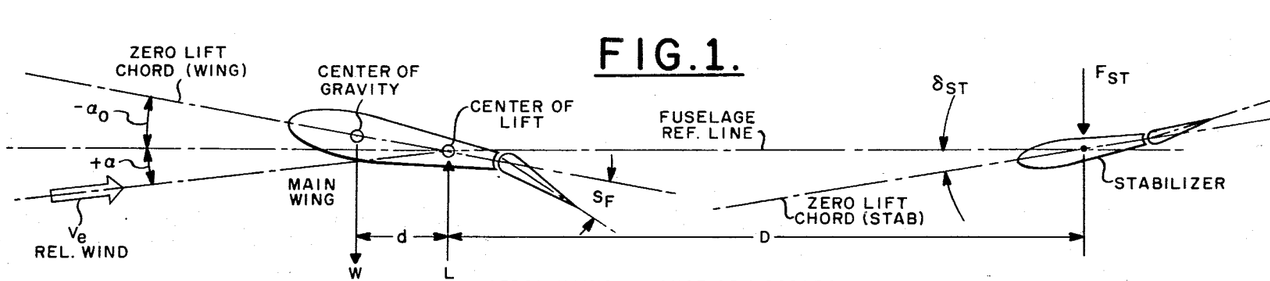
FIG. 1 is a diagram representing the aerodynamic forces acting on an aircraft in trimmed flight.
Figure 2:
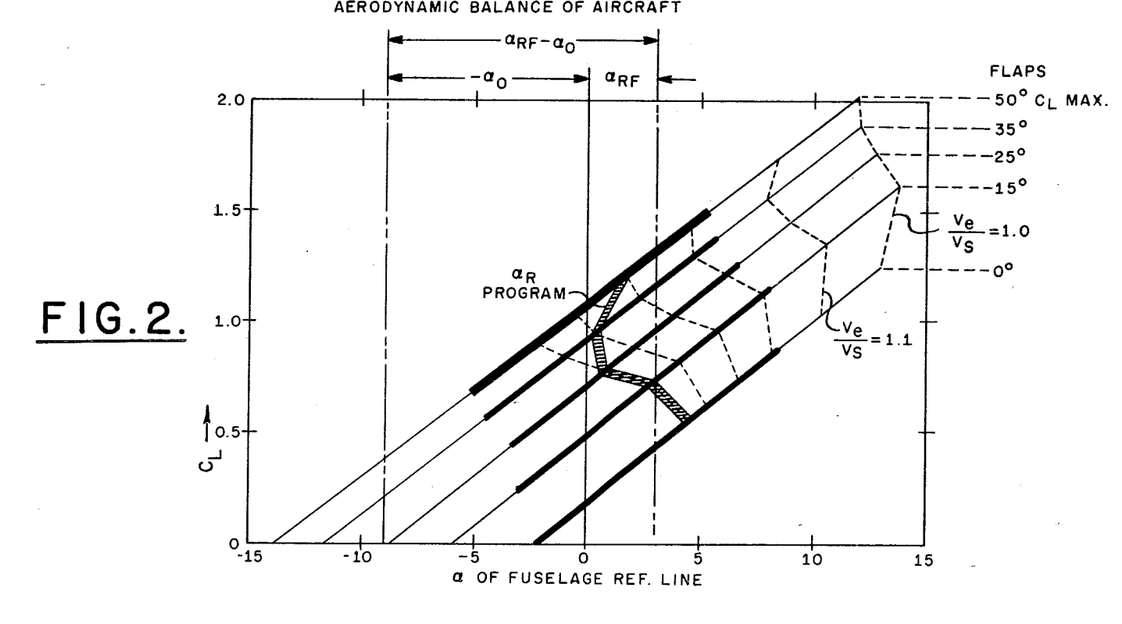
FIG. 2 is a diagram illustrating a selected stall margin program for a typical multi-engine jet transport.

The lift L of the aircraft is the net aerodynamic force on the lifting surfaces $$L = C_L q S \qquad (1)$$

where $C_L$=lift coefficient, $q=\tfrac{1}{2}\rho_0 V_e^2$, where $q$=dynamic pressure, $\rho_0$=standard air density, $V_e$=equivalent airspeed, and S=wing area. The characteristics of the coefficient of lift $C_L$ of a typical multi-jet transport aircraft in trimmed flight is illustrated in FIG. 2. The series of lines represent the lift characteristics over the useful range of values of angle attack, $\alpha$, of the fuselage reference line (FIG. 1) each line corresponding to a specific deflection of the wing flaps, the heavy portion thereof indicating the range of interest. The $C_{LMAX}$ values represent the stall coefficients of lift at unit load factor for various flap positions; $\alpha_o$ represents the fuselage angle of attack at zero lift and $\alpha_{RF}$ represents a reference angle of attack.

The equivalent airspeed $V_e$ of an aircraft may be expressed:

$$V_e = \sqrt{\frac{2W}{C_L \rho_o S}} \text{ at unit load factor} \quad (2)$$

and the stall airspeed may be expressed $$V_S = \sqrt{\frac{2W}{C_{LMAX} \rho_o S}} \text{ at unit load factor} \quad (3)$$

The dotted lines intersecting the lift characteristic lines of FIG. 2 represent lines of constant stall margin, i.e. lift coefficients that reflect constant ratios of airspeed to stall speed of 1.2, 1.2, 1.3, 1.4 and 1.5. Therefore, from Equations 2 and 3 above the reference lift coefficient may be expressed $$C_{LRF} = C_{LMAX} \left(\frac{V_s}{V_{RF}}\right)^2 \quad (4)$$

In accordance with the teachings of the present invention the speed command system utilizes in some of its modes of operation; for example, the approach and landing modes, a reference angle of attack program or schedule as a function of flap position that will result in a particular unit load factor stall margin for each flap position. This program is determined primarily by the type of aircraft and desired operating procedures. An $\alpha_{RF}$ program for a typical multi-jet transport is illustrated by the heavy shaded line of FIG. 2 and reflects a stall margin program of 1.5 for flap positions between 8° and 30°, 1.4 between 30° and 40° and at full flaps of 50° the ratio is 1.3. Therefore, the reference angle of attack, $\alpha_{RF}$, is the fuselage angle of attack corresponding to a specific ratio of reference airspeed, $V_{RF}$, to stall airspeed, $V_s$, at unit load factor.

It should be noted here that Equation 2 is in terms of equivalent airspeed, $V_e$. A conventional Pitot-static type airspeed detector supplies directly a measure of calibrated airspeed $V_c$. Since this measure is readily available, it will be used instead of $V_e$. However, it may be shown that the error arising from the use of $V_c$ instead of $V_e$ is negligible for altitudes below 10,000 feet and therefore in the present case the general term V will be used to denote either $V_e$ or $V_c$.

Equations 2 and 3 are based on steady flight in which the load factor is unity (where lift equals gross weight). An objective of the teachings of the present invention is to display a reference airspeed which does not vary in turbulent conditions but which will reflect the increased load factor during bank angle turns. In order to restrain the reference airspeed from reacting to gust conditions, but at the same time, to allow it to react expeditiously to increase in load factor in a banked turn, it is necessary to apply a filter to that portion of the computation which reflects gross weight.

Gross weight is an ideal factor for application of a heavy filter because the gross weight of an aircraft changes very slowly (typically .002% per second) and therefore can utilize a filter, such as a low pass R-C filter network, having a time constant of the order of 30–50 seconds without introducing significant lag on the computation of gross weight. If on the other hand the filter is applied to other factors, such as on the sensing of angle of attack, the response to maneuvering bank turns will also be sluggish and the display will lag in an unsatisfactory manner.

Equation 1 can be modified to reflect the load factor of a banked turn as follows:

$$L = \frac{W}{\cos \phi} = C_L q S = C_{L\alpha}(\alpha - \alpha_o) \quad (5)$$

$$(1/2 \rho_o V_e^2) S$$

Equation 5 can also be expressed in terms of $C_{LMAX}$ and stall speeds as follows:

$$L = \frac{W}{\cos \phi} = C_{LMAX} (1/2 \rho_o V_s^2) S \quad (6)$$

Through the use of Equation 4, Equation 6 can be written:

$$\frac{W}{\cos \phi} = C_{L_{RF}}(1/2\rho_o V_{RF}^2)S = C_{L\alpha}(\alpha_{RF} - \alpha_o)(1/2\rho_o V_{RF}^2)S \quad (7)$$

The speed command system of the present invention may use a direct measure of angle of attack of the aircraft by means of a vane sensor or it may be computed, the latter method being employed herein since vanes and probes are not generally provided on commercial aircraft and because of the difficulty of locating a vane in an undisturbed airstream. Angle of attack $\alpha$ is a function of aircraft pitch attitude $\theta$ and flight path angle $\gamma$:

$$\alpha = (\theta - \gamma) \quad (8)$$

Expressed in terms of vertical gyro and air data parameters in the vertical plane of the earth $$\alpha \cos \phi = \theta_L - \gamma_L \quad (9)$$

where $\phi$ is aircraft bank angle relative to the horizontal, $\theta_L$ is pitch angle sensed by a vertical gyro and $\gamma_L$ is flight path angle as sensed by an air data computer.

Flight path angle measure $\gamma_L$ may be generated in any of a number of ways from air data. See for example applicant's U.S. Pat. 3,147,424 or applicant's assignee's U.S. Pats. 2,896,145 and 2,949,261. As disclosed in these patents, flight path angle $\gamma_L$ in the vertical plane may be determined from measures of airspeed and vertical rate $$\gamma_L = \frac{K\dot{h}}{V} \quad (10)$$

where $\gamma_L$ is small, $\dot{h}$ is true vertical speed and V is true forward airspeed. It may be shown that for purposes of the present invention $\gamma_L$ can be computed with sufficient accuracy from the following relation $$\gamma_L = .0877 \dot{h} \frac{p^{0.4}}{qc^{0.5}} \quad (11)$$

where:

$p$ = static pressure—pounds per square foot
$qc$ = Pitot-static pressure—pounds per square foot

MECHANIZATION OF RELATIONSHIPS

Figure 3A:
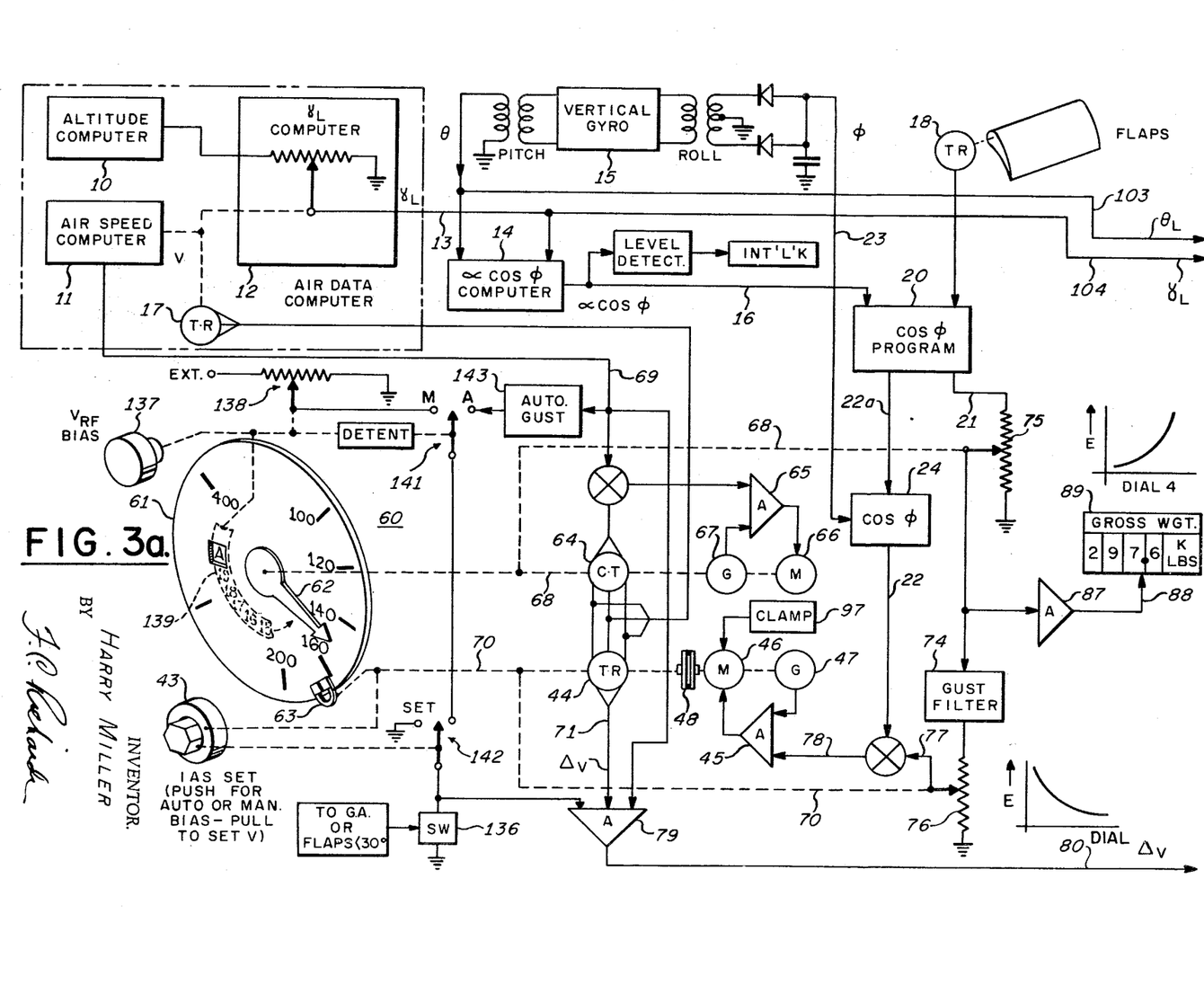
FIGS. 3A and 3B taken together illustrate a preferred embodiment of the speed command system of the present invention.
Figure 3B:
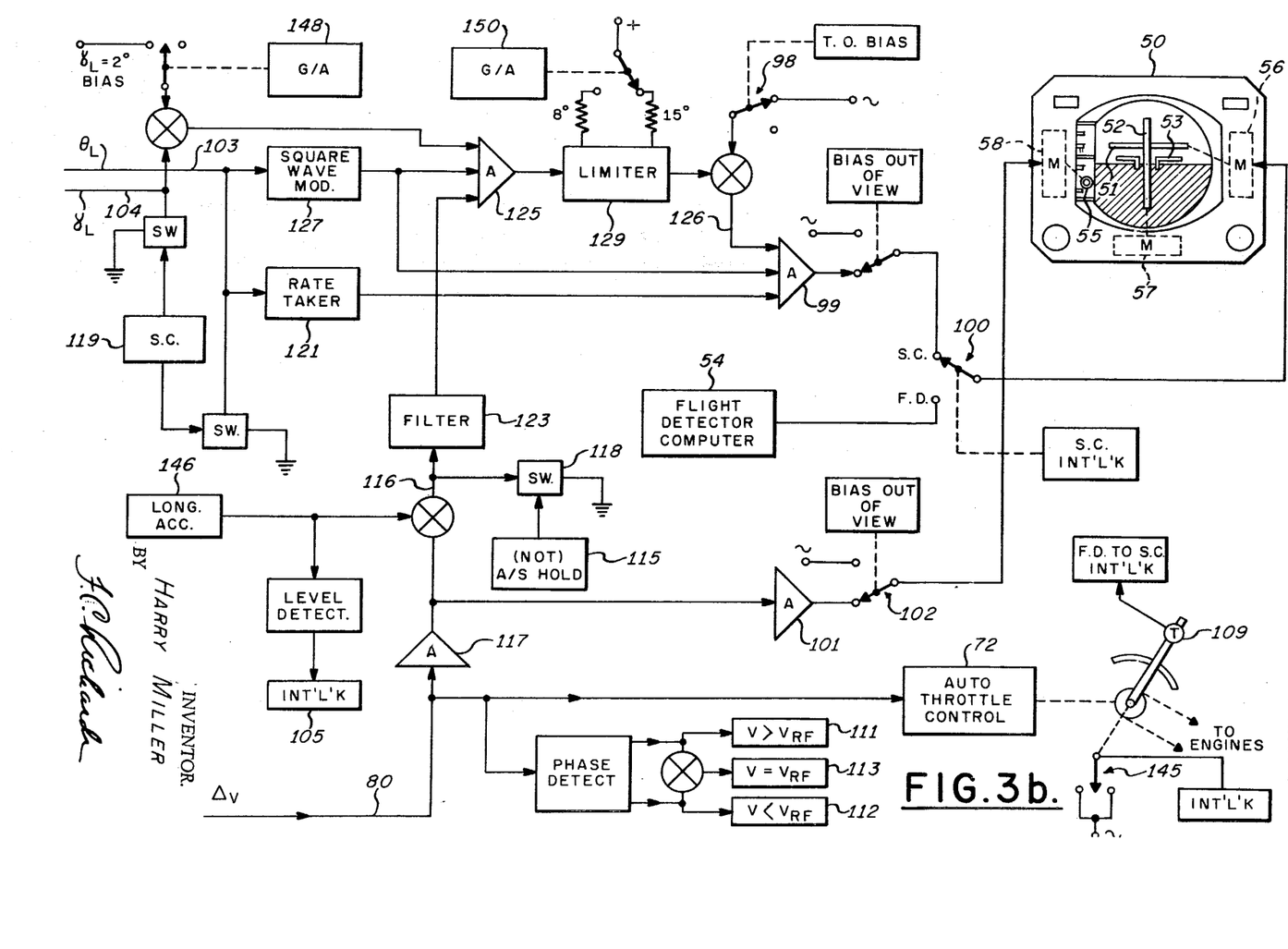

The foregoing relationships used in the speed command system of the present invention are derived from input parameters available in most modern commercial transports, viz Pitot and static pressures, pitch and roll attitude and flap position. The output functions derived are: flight path angle ($\gamma_L$), angle of attack ($\alpha$), airspeed (V), reference airspeed ($V_{RF}$) and gross weight (W). FIG. 3A and FIG. 3B comprise a schematic representation of the speed command system of the present invention and includes apparatus for deriving these parameters.

Referring to FIG. 3A, altitude rate or vertical speed $\dot{h}$ is supplied from an altitude from an altitude computer 10 which may be of the force follow-up type illustrated in my U.S. Pat. 2,729,780 joint with R. D. Love wherein the $\dot{h}$ term is derived from a potentiometer excited by the tachometer output of the force follow-up loop and $p^{0.4}$ term is derived from a potentiometer driven by the force follow-up motor, the two potentiometers being connected in cascade. Airspeed computer 11, which may be mechanically similar to altitude computer 10, supplies a mechanical output V corresponding to the forward airspeed of the aircraft in the sustaining air mass. These two terms are supplied to a flight path angle computer 12 where Equation 11 is solved whereby to supply the flight path angle output $\gamma_L$ on lead 13.

The term ($\alpha \cos \phi$) is derived in computer 14 in accordance with Equation 9 above, from the flight path angle measure on lead 13 from computer 12 and pitch attitude measure from a vertical gyro 15. Conventional analog computation techniques may be used. For example, signal voltages proportional to $\gamma_L$ and $\theta$ may be simply algebraically combined through a summing network. The angle of attack measure $\alpha \cos \phi$ is supplied on lead 16 for use in the system.

The mechanical output of the airspeed computer 11 is coupled with a synchro transmitter 17 for supplying an actual airspeed signal to a speed command indicator to be described below. The system input proportional to flap angle, $\delta_F$, is supplied by a flap position transducer 18, which may be a synchro.

STALL MARGIN PROGRAM

During some operating modes of the speed command system, the reference airspeed $V_{RF}$ value will be maintained consistent with a desired or predetermined stall margin program as a function of the position of the aircraft flaps. FIG. 2 illustrates the relationship between stall margin, flap position and angle of attack. The shaded stall margin line represents the stall margin program for a typical jet transport and determines the reference angle of attack program required to maintain such stall margin program as the flaps are extended and retracted.

Figure 4:
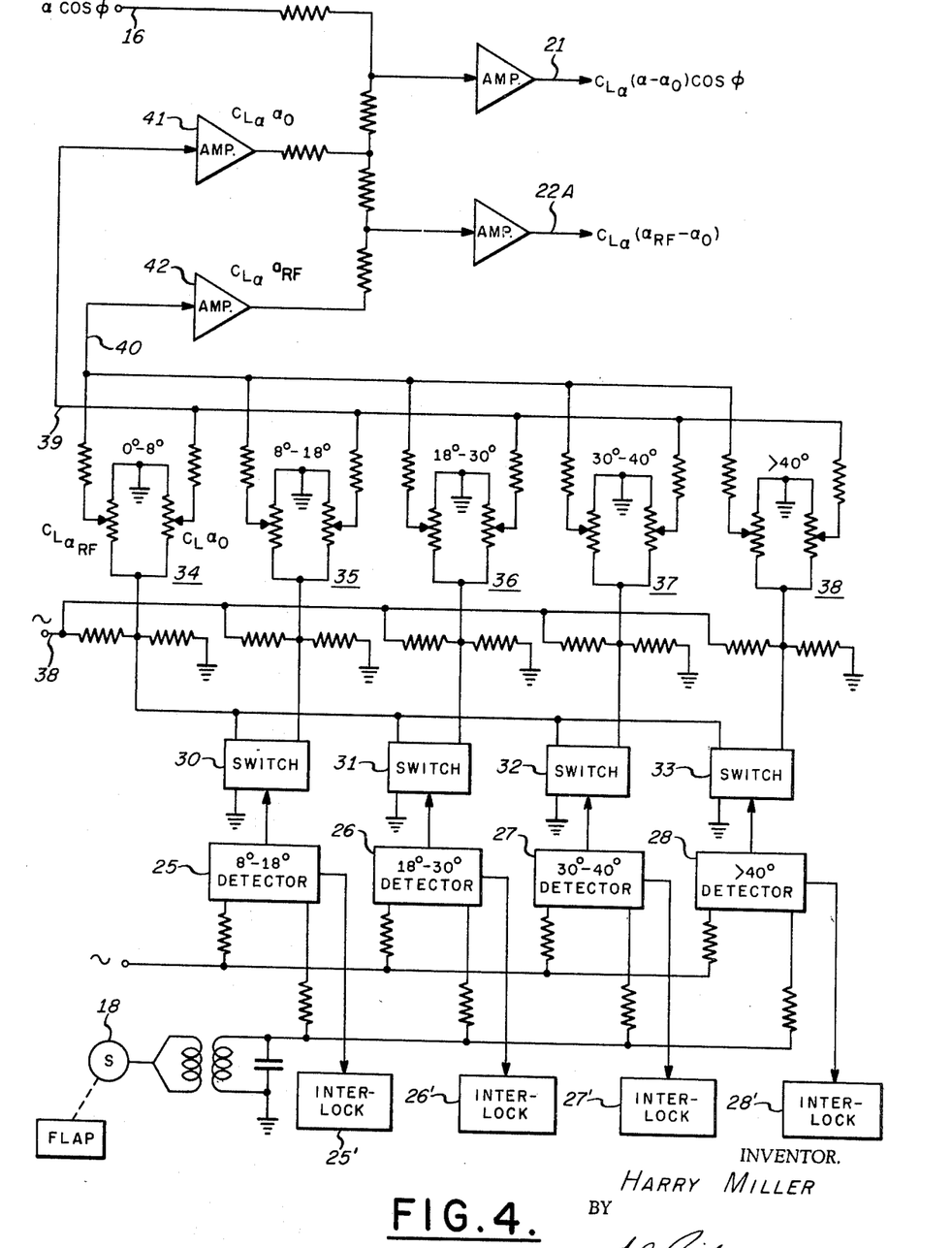
FIG. 4 is a schematic diagram of apparatus for generating the angle of attack reference values for establishing the stall margin program of FIG. 2.

Referring again to FIG. 3A, the reference angle of attack program is derived within the $\alpha \cos \phi$ program computer 20 and in conjunction with a bank angle signal from the vertical gyro 15 via lead 23 and multiplier 24 furnishes outputs proportional to $C_{L\alpha}(\alpha-\alpha_0)\cos\phi$ and $C_{L\alpha}(\alpha_{RF}-\alpha_0)\cos\phi$ on leads 21 and 22 respectively, for use in computing the reference airspeed $V_{RF}$ for maintaining the desired stall margin program, as will be described below. An example of a circuit for producing the required signal outputs is illustrated in FIG. 4. As shown, the reference angle of attack $\alpha_{RF}$ is programmed as a function of flap position and while in some cases it may be desirable to program it continuously over the range of flap movement, it may be sufficient in other cases to vary it in step fashion. The present system uses the latter technique. For this purpose, the flap position transducer 18 provides a signal proportional to the angular position of the flaps relative to the fuselage reference line. The synchro output is transformer coupled to a plurality of voltage level detectors 25, 26, 27 and 28 arranged to provide outputs to corresponding switch devices 30, 31, 32 and 33 when the flaps move through the ranges 8°–18°, 18°–30°, 30°–40° and greater than 40° respectively. Voltage level detectors also supply outputs for operating corresponding interlock circuits 25'–28'. Switches 30–33 control adjustable impedance networks 34, 35, 36, 37 and 38 energized from a suitable voltage source to provide two predetermined voltage outputs $C_{L\alpha}\alpha_{RF}$ and $C_{L\alpha}\alpha_0$. Each of the impedance networks 34–38 include settable potentiometers as shown for the purpose of establishing the values of $C_{L\alpha}\alpha_{RF}$ and $C_{L\alpha}\alpha_0$ for each position range of the flaps. The value $C_{L\alpha}$ is determined from the slope of lift characteristics, FIG. 2. The value $\alpha_0$ is determined for any particular aircraft type by the intercept of the lift characteristic lines with the zero lift axis while the value $\alpha_{RF}$ is predetermined by the desired value of angle of attack for each flap position range as established by the flap program (FIG. 2) to thereby establish the stall margin program. Thus the $C_{L\alpha}\alpha_0$ and $C_{L\alpha}\alpha_{RF}$ voltages from their corresponding potentiometers are supplied via leads 39 and 40 to respective amplifiers 41 and 42. The output of $C_{L\alpha}\alpha_0$ amplifier 41 is summed with the output 16 of $\alpha \cos \phi$ computer 14 whereby to provide the $C_{L\alpha}(\alpha-\alpha_0)\cos\phi$ signal on lead 21 and it is also summed with the $\alpha_{RF}$ output of amplifier 42 whereby to provide the $C_{L\alpha}(\alpha_{RF}-\alpha_0)$ signal on lead 22a. This signal is further modified by the $\cos\phi$ term to result in a signal on lead 22 which is proportional to $C_{L\alpha}(\alpha_{RF}-\alpha_0)\cos\phi$. An example of the $\alpha_{RF}$ program parameters for a typical multi-jet transport may be as follows (determined from FIG. 2):

REFERENCE ALPHA PROGRAM PARAMETERS

| Flap angle degrees | $C_{LMAX}$ | Stall margin | $C_{LR}$ | $\alpha_R$ | $\alpha_0$ | $(\alpha_R-\alpha_0)$ |
|---|---|---|---|---|---|---|
| 0 | 1.240 | 1.5 | 0.551 | 4.46 | −2.30 | 6.76 |
| 15 | 1.620 | 1.5 | 0.720 | 2.84 | −6.00 | 8.84 |
| 25 | 1.760 | 1.5 | 0.782 | 0.64 | −8.80 | 9.44 |
| 35 | 1.880 | 1.4 | 0.959 | 0.37 | −11.60 | 11.97 |
| 50 | 2.022 | 1.3 | 1.195 | 1.76 | −14.00 | 15.76 |

There are two panel mounted display or read-out instruments in the speed command system of the present invention one of which may be a conventional flight director instrument 50 (FIG. 3B) having pitch and roll command pointers 51 and 52 respectively the displacement of each with respect to miniature aircraft symbol 53 denoting the change in craft attitude required to satisfy the command. Flight director 50 may be of the general type disclosed in the present assignee's U.S. Pats. 2,613,350, 2,613,352 and 2,782,395 and is normally controlled from a conventional flight director computer 54 which may also be of the type disclosed in these patents. For purposes of the present invention, flight director indicator 50 is provided with a fast-slow indicator 55 which, as will become apparent, is used as an output of the speed command system to indicate the magnitude of deviation of the actual airspeed, $V_e$, of the craft from the reference airspeed, $V_{RF}$. The indicator pointers 51, 52 and 55 may be positioned by conventional meter movements 56, 57 and 58 respectively.

The other display instrument of the present invention is a speed command indicator illustrated schematically in FIG. 3A and designated generally by reference character 60. In accordance with the teachings of the present invention the indicator is employed in the computation of the reference airspeed $V_{RF}$ through circuitry contained therein.

Indicator 60 includes a fixed, suitably calibrated airspeed dial 61 and first and second indicator pointers 62 and 63 for indicating the actual airspeed V of the aircraft and the reference airspeed $V_{RF}$ respectively; the latter pointer will hereafter be referred to as the cursor. Actual airspeed pointer 62 is slaved to the airspeed computer 11 through a generally conventional follow-up servo loop including airspeed transmitter 17, control transformer 64, servo amplifier 65, motor 66 and speed generator 67 arranged to drive pointer shaft 68 in accordance with the actual airspeed $V_e$ of the craft. As stated above, airspeed computer 11 may be of the motor driven, force-follow-up type as disclosed in my above noted Pat. 2,729,780 so that the position of synchro 17 provides a more-or-less long term measure of actual airspeed. Lead 69 provides a signal that is the direct output of the airspeed transducer (bellows pick-off) and hence provides a short term correction of the long term measure of actual airspeed. This latter signal may also be supplied to follow-up amplifier 65 for the purpose of increasing the response of the pointer 62 to airspeed changes.

The cursor 63 is positioned in two ways: by manual set knob 43 or by a second servo loop comprising control transformer 44 connected back-to-back with control transformer 64, servo amplifier 45 and motor 46—generator 47, coupled with cursor shaft 70. In certain modes, such as take-off and normal cruise under auto throttle control, the knob 43 is used to set a desired $V_{RF}$ to be achieved and maintained. This is done by pulling out knob 43 and rotating the cursor 63 to the desired IAS setting which operation is permitted by suitable slip clutch 48. This in turn positions control transformer 44 thereby generating a signal on lead 71 proportional to any error between the selected airspeed and the actual airspeed. This signal, in the cruise auto throttle mode for example, is applied to the auto throttle control system 72 (FIG. 3B) to adjust the craft airspeed until the actual speed equals the set speed at which time the error signal from synchro 66 goes to zero and the pointer 62 is aligned with the cursor 63. In the take-off mode the error signal is supplied to indicator 55 as will be described. The throttle control 72 may be of the general type shown in the present assignee's U.S. Pats. 2,626,767 or 2,888,219.

As stated above, the indicator 60 includes computation circuitry for computing a reference airspeed $V_{RF}$ determined by the outputs of the $\alpha \cos \phi$ program circuit 20. The equation to be solved is Equation 7 above. This equation may be rearranged as follows:

$$\frac{W}{\frac{1}{2}\rho_o S V_{RF}^2} = C_{L\alpha}(\alpha_{RF} - \alpha_o) \cos \phi \qquad (12)$$

Basically this equation is solved by generating electrical voltages proportional to $$-\frac{W}{\frac{1}{2}\rho_o S V_{RF}^2} \text{ and } C_{L\alpha}(\alpha_{RF} - \alpha_o) \cos \phi$$

and equating them through the cursor servo loop. Lead 21 provides a voltage proportional to $-C_{L\alpha}(\alpha - \alpha_o) \cos \phi$ which is used to excite the winding of a functional potentiometer 75, having the characteristic indicated, the wiper of this potentiometer being positioned by the $V_e$ pointer follow-up motor shaft 68 to generate a voltage on lead 73 proportional to $C_{L\alpha}(\alpha - \alpha_o) \cos \phi V_e^2$ which is equal to $$\frac{W}{\frac{1}{2}\rho_o S}$$

by rearrangement of Equation 5. This voltage, being proportional to gross weight, is subjected to a gust filter 74. The output of the filter 74 is used to excite the windings of potentiometer 76 which has a characteristic proportional to $$\left(\frac{1}{V_{RF}}\right)^2$$

(as indicated in FIG. 3A) whereby the wiper output is $$-\frac{W}{\frac{1}{2}\rho_o S V_{RF}^2}$$

which is the first term of Equation 12 and is supplied on lead 77. To this signal is added the signal on lead 22 proportional to $C_{L\alpha}(\alpha_{RF} - \alpha_o) \cos \phi$ the algebraic sum being supplied to servo amplifier 45 via lead 78 whereby to drive the cursor servo motor 46 and hence shaft 70 and wiper of potentiometer 76 in a direction and to an amount to zero the input to amplifier 67 whereby the position of shaft 70 and hence indicator cursor 63 corresponds to the computed reference airspeed $V_{RF}$. Thus, there is provided apparatus for computing and indicating or displaying the value of $V_{RF}$ required to cause the aircraft to fly in accordance with a predetermined stall margin program as a function of flap position. Depending upon the flight mode, any error between cursor position and pointer position ($\Delta V$) is supplied via summing amplifier 79 and lead 80 to the fast-slow indicator 55 of the flight director 50 or to the throttle through the auto throttle system 72.

In accordance with the teachings of the present invention, the gross weight W of the aircraft may be displayed to the pilot using the voltage output from the wiper of potentiometer 75. This signal is supplied to indicator amplifier 87 whereby the output 88 will be proportional to gross weight, this signal being applied to a suitably calibrated counter 89 for indicating directly the gross weight of the aircraft in the thousands of pounds.

The structural arrangement of the remainder of the speed command system of the present invention will be included in the following description of the operation of the system in typical flight modes; for example, in the take-off, approach and landing, and go-around modes. During this description, reference will be made to FIGS. 5, 6 and 7 which depict typical vertical flight profiles for these modes.

TAKE-OFF MODE

Figure 5:
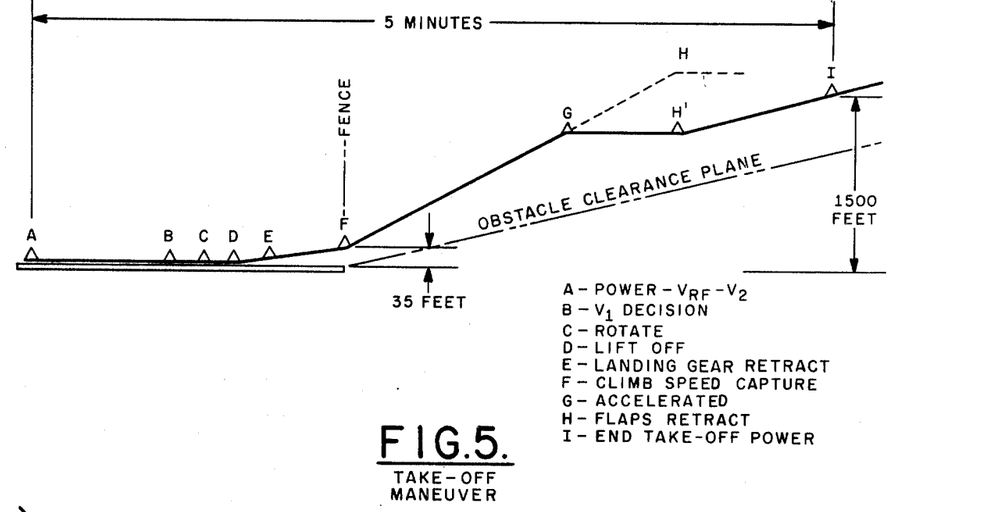
FIGS. 5, 6 and 7 are diagrams of vertical plane flight path profiles useful in understanding the operation of the present invention.

The take-off maneuver profile is illustrated in FIG. 5. For the purposes of the present invention it is broken down into several phases—ground roll, fixed pitch climb, airspeed climb, acceleration and final climb. This maneuver is governed by many regulations and requirements imposed by governmental authorities, airframe and engine characteristics and weather; for example, regulations concerning climb gradient with most critical engine failed, take-off power restrictions to five minutes, the attainment of 1500' altitude after five minutes at specified climb gradient, etc.; and weather conditions such as air density, temperature and winds. The speed command system of the present invention greatly aids the pilot during the take-off maneuver by automatically assessing the aircraft performance and indicating to the pilot the optimum control to be applied and when to apply it.

It should be understood that in pratice the system of the present invention includes a great many interlock circuits for governing its operation. In some cases these will be manually initiated through a mode selector switch 100 which may be associated wth the flight director computer 54; however, in order to relieve the pilot, most are automatically initiated when predetermined conditions have been satisfied. Only the more significant interlocks have been schematically illustrated and/or described herein in the interest of brevity.

The take-off mode will be automatically established whenever the mode selector is in the speed command (SC) position and weight is on the nose wheel and the flaps are at take-off setting. Under these conditions, the cursor servo motor is clamped through interlock 97 and a fixed pitch bias is applied to the flight director pointer 51 through take-off bias switch 98 commanding a predetermined pitch up attitude, in the present example, about 8°. This fixed pitch command is applied to pointer 51 through amplifier 99 and switch 100 to move the pointer up indicating a "fly-up" command.

At the gate, point A FIG. 5, the pilot pulls out knob 43 and sets the cursor 63 to the $V_2$ reference speed. The $V_2$ speed setting is determined by charts relating this speed to the stall speed of the aircraft, normally 1.2 $V_s$. (for a particular take-off flap setting, usually between ¼ and ½ full flaps and in the present example 12° or 23°) and gross weight, airport altitude and ambient temperature. The dependence of $V_2$ upon air density relates to the requirements that sufficient directional stability will prevail should an outboard engine lose thrust. Normally, a bias is added to $V_2$ as a reserve, should an engine fail. When an engine fails, the pilot is instructed to reduce the airspeed to $V_2$.

During the ground roll, pitch command bar 51 will register "fly-up" due to the pitch up bias. Also, since the cursor servo 46 is clamped and since V is less than $V_2$, the signal output $\Delta V$ of synchro 44 supplied to "fast-slow" pointer 55 of flight director 50 through amplifier 101 and switch 102 will cause the pointer to indicate hard over "slow." When, at point C FIG. 5, the aircraft reaches the proper rotation speed (which is also predetermined by reference to charts), the pilot will rotate the aircraft until the pitch bar 51 is centered. The centering signal is the pitch attitude and pitch rate signals from vertical gyro 15 applied on lead 103 which cancels out the pitch command. The aircraft will continue to accelerate and at point D will have achieved enough speed to lift off. At point E, usually about three seconds after lift off, the pilot will begin gear retraction. The fixed pitch climb phase will be maintained until the airspeed has increased from rotation speed to $V_2$ which is normally reached near the "fence," point F in FIG. 5. As the aircraft accelerates from its rotation speed to $V_2$, the $\Delta V$ signal output from synchro 44 will begin to approach zero and, hence, the airspeed indicator pointer 62 will approach the preset cursor 63, and simultaneously the fast-slow indicator 55 of flight director 50 will approach its center position. When it is centered, $\Delta V=0$, the pitch bar 51 will be switched automatically to command elevator motion and hence a pitch attitude such as to maintain the difference between actual speed and $V_2$ speed at a value proportional to flight path angle. Should the aircraft lose thrust because of failure of an engine, the flight path angle will decrease, causing the pitch bar to be centered at an airspeed that is closer to $V_2$ by a value equal to the change in path angle. The air speed sensitivity is nominally set to cause the airspeed to change one knot for each degree change in path angle. Thus, a loss of 10 degrees in path angle will result in a decrease in air speed of 10 knots.

The above switching is accomplished by interlocks sensitive to $\Delta V$ signal on lead 80 which is applied to "greater than" and "less than" detectors 111 and 112 and null detector 113. Interlock 113 serves to remove the 8° fixed pitch bias through switch 98 and to operate airspeed hold interlock 115 such as to remove the shunt to ground of the $\Delta V$ signal on lead 116 through inverting amplifier 117 by switch 118. Similarly, interlock 113 causes speed command interlock 119 to open their associated shunt switch thereby rendering effective the flight path angle and the pitch rate circuits 104 and 121 to control pointer 51. In practice an elevator position signal may also be provided if further lead or "quickening" is desired.

During the airspeed-on-pitch climb phase, the airspeed error signal is smoothed as by filter 123 and algebraically combined in summing amplifier 125 with the flight path angle on lead 104 to form the primary pitch command signal to pointer 51, i.e. flight path angle is balanced against airspeed error. A pitch rate term, provided by rate circuit 121, is also provided as a quickening or anticipation term. The pitch attitude signal from square wave modulator 127 is also supplied to sum amplifier 125 the output of which is limited at 129 and supplied on lead 126 to pointer amplifier 99 as the resultant pitch command. The pitch attitude signal is also applied directly to amplifier 99. As stated above, the pitch rate signal serves to increase the response of pointed 51 to pilot control in changing attitude in response to the combined airspeed error and flight path angle command data. Thus, as the thrust on the aircraft tends to increase the airspeed beyond $V_2$ path angle, the excess airspeed error moves pointer 51 in a sense to command a pitch up of the aircraft which will tend to convert the thrust into lift and tend to maintain the airspeed constant, the net result being the establishment of a pitch attitude consistent with an airspeed of $V_2$ plus a bias proportional to flight path angle. In this sense the input to limiter 129 is a pitch attitude signal proportional to airspeed. The limiter 129 is set, in this mode, to limit pitch attitude to 15°. If for some reason, such as a light aircraft load and high air density, the airspeed signal should command an attitude greater than 15°, the limiter will limit the command signal to maintain the attitude command at 15°, allowing the airspeed to increase as required to absorb the excess thrust. In this case the fast-slow indicator 55 will read "fast." Since it is desired that the limiter provide a "hard" or sharp limit, the sinusoidal $\Delta V$ and pitch attitude signals may be square-wave modulated.

In a normal four-engine take-off, the aircraft will reach the required 1500 feet of altitude well within the five minute take-off thrust limitation indicated by the flight path in FIG. 5 at which point the aircraft will be leveled off (at point H) and allowed to accelerate to an airspeed about 25 knots above $V_2$, where the flaps will be retracted. However, should an engine fail, particularly under high weight, low air density conditions, the airspeed climb segment will have to be terminated below the 1500 foot altitude (point G FIG. 5) so as to allow the aircraft to accelerate to a speed ($V_2+25$ knots) at which the flaps may be retracted to reduce drag (point H'). This may be accomplished in two ways: the flight director may be switched to "altitude hold" (as described in the above Pats. 2,613,350 and 2,613,352) which will disengage the speed command mode and the flight director pointer will command a pitch attitude such as to maintain a predetermined altitude during which the airspeed will be allowed to increase to $V_2+25$ knots. Or the pilot may leave the speed command mode engaged and fly horizon indicator 125 to level flight temporarily ignoring the flight director pointer 51. In either case, the fast-slow indicator 55 will read "fast" and the airspeed pointer 62 will advance beyond the cursor 63 $V_2$ set position.

At point H or H' during the take-off maneuver, at a velocity of about $V_2+25$ knots for a typical four engine jet transport, the pilot will retract flaps. Flap retraction is used as an automatic cue to cause the reference cursor servo 44–47 to become active. Flap position interlocks 25' and 26' are therefore arranged to operate cursor clamp 97 to supply energizing power to servo motor 46. This arrangement is such that the switching of cursor clamp 97 occurs when flaps are retracted to a first position less than 18° for a 23° flap take-off or retracted to a second position less than 8° for a 12° flap take-off. Thus, the cursor is positioned in the manner described above to indicate the programmed stall margin. For the purposes of the present disclosure, flap retraction will be considered to end the take-off mode.

APPROACH AND LANDING MODE

The description and operation of the speed command system of the present invention in the approach and landing mode will be described in connection with FIG. 6. It will be assumed that during cruise and the let down from cruise altitude to an assigned holding altitude, the aircraft will be controlled by an automatic pilot or by the flight director 54 operating in its altitude hold or vertical speed mode. During let down, the throttles will not be under automatic control but will normally be manually positioned near idle. Also during these modes, the mode selector switch will be in other than its speed command position, e.g. in a flight director position. Interlock 97 is so arranged that the cursor servo is unclamped whenever the mode selector is in its flight director mode and, therefore, the cursor 63 is positioned in accordance with the stall margin program described above so that during the let down to and while at the holding altitude, the speed command indicator 60 will indicate to the pilot his actual airspeed relative to a flap programmed reference airspeed and he may use this indicator as an aid controlling the throttle position and/or flap position. While in the holding pattern, specific speeds are prescribed for assigned altitudes. For example, a typical four engine jet transport must maintain 230 knots above 14,000 feet, 210 knots between 6,000 feet and 14,000 feet and 200 knots below 6,000 feet. Also, because maneuvers requiring significant bank angles are performed in the holding pattern, the flap configuration will be set such as to allow at least a 1.5 $V_s$ stall margin when operating within these allowable holding speeds.

Preferably, when the aircraft has leveled off at the holding altitude (point A FIG. 6) the autopilot will be engaged and in its altitude hold mode. At this time, the pilot engages the automatic throttle control 72. The speed error, $\Delta V$, is applied to the throttle servo to thereby adjust craft speed to the cursor value which is 1.5 $V_s$ for flap positions between 8° and 30°. If this speed is not within the prescribed speeds, the pilot will adjust the flaps to obtain a 1.5 $V_s$ margin that is within the limits. For example, if the flaps are lowered to their 12° position, the airspeed reference cursor will be positioned by the $\alpha \cos \phi$ program 20 to a new value consistent with this flap position through the $V_e$ and $V_{RE}$ computer networks 22, 75 and 76.

Figure 6:
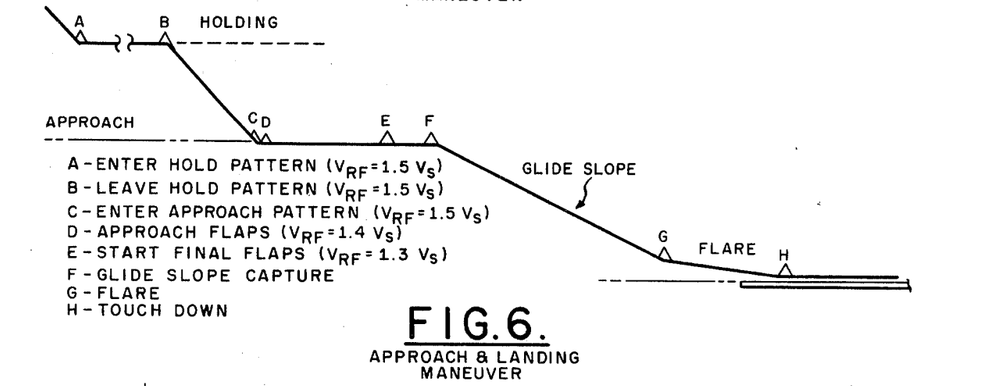

When the aircraft is released from the holding pattern, the auto throttle control will adjust the throttles as required to maintain the stall margin program as the aircraft is maneuvered from point B to point F, FIG. 6.

Usually, when the aircraft captures the approach pattern altitude, the flaps are lowered to a position greater than 30°. In a typical case the stall margin will be lowered to 1.4 for flaps between 30° and 40°. At this time, flap interlock 27' (FIG. 4) will be actuated which in turn will cause a shunt switch 136 to open thereby inserting into the ΔV amplifier 79 a controllable bias. This bias is generated either manually or automatically as will now be described.

The stall margins discussed above are used when wind conditions are calm or near calm. Where gusts are reported, the pilot will add a bias to the reference airspeed when the aircraft is in the approach pattern, the value of which is typically equal to one-half the steady headwinds plus the full value of the reported gust factor, not exceeding, however, twenty knots, in order to minimize the speed bleedoff after touchdown.

Thus, the speed command indicator 60 is provided with a knob 137 which actuates a potentiometer 138 which in turn supplies a bias voltage proportional to the desired airspeed bias in knots. The knob actuates a dial 139 calibrated in knots and so arranged that the selected speed bias appears in a cut-out 140 in the dial face. This electrical bits is supplied through switches 141 and 142 to ΔV amplifier 79 where it is added to the ΔV signal from cursor synchro 44.

Knob 137 is also provided with a detent position at which the letter "A" appears in the window 140. When in this detent position, the switch 141 is placed in position "A" and the bias is supplied automatically at the value consistent with the local air turbulence. The automatic bias signal is provided from auto-gust amplifier 143, the input of which is the short term air data signal from airspeed computer 11 appearing on lead 69 as described above.

When the aircraft is aligned with the localizer beam, large bank angles are no longer required so that the flaps may be further lowered and the stall margin decreased to 1.4 $V_s$. In accordance with the teachings of the present system, as the flaps are lowered below 30° the 1.4 $V_s$ margin is programmed by the angle of attack program 20 and the cursor 63 is therefore positioned by the cursor servo to an airspeed corresponding to 1.4 $V_s$, the ΔV error operating the throttles to maintain the 1.4 $V_s$ margin plus the gust bias.

At point F in FIG. 6, the aircraft will capture the glide slope beam (under autopilot or flight director control) and the pilot will lower flaps to landing configuration, usually greater than 40°. With this flap setting, the stall margin program calls for a stall margin of 1.3 $V_s$ and the cursor 63 will again be repositioned to indicate 1.3 $V_s$ on indicator 60 and the ΔV signal will adjust the throttles to maintain this stall margin airspeed plus the gust bias, During the final approach, the aircraft will normally be under automatic pilot control, monitored by the flight director 54 or under flight director only with throttles being controlled by the speed command system as described.

GO AROUND MODE

Figure 7:
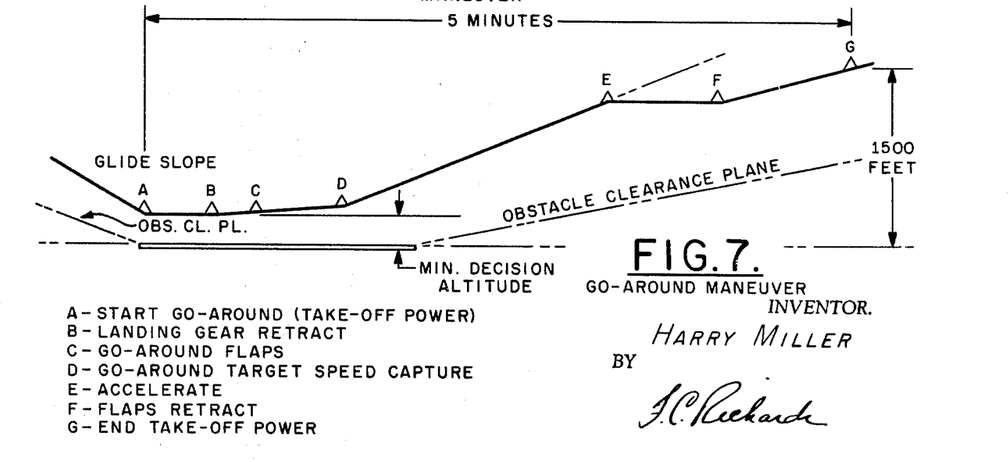

During the final approach under IFR conditions, if the pilot does not see the runway when the aircraft has reached the minimum decision altitude, he is required to make a go-around. The sequence of events during this maneuver is shown in FIG. 7. During the glide slope descent, the throttles will be positioned by the speed command system of the present invention to maintain a 1.3 $V_s$ margin in accordance with the program (flaps >40°) plus any guest bias. If a go-around is required, the pilot at point A presses a palm switch 109 on the throttle levers, advances the throttles to take-off thrust thereby activating interlock switch 145, and begins flap retraction to take-off flap position. These events will automatically place the speed command system in the go-around mode. Also, a longitudinal accelerometer 146 may provide an interlock signal, as at 105, if the forward acceleration of the craft exceeds a predetermined value, say .1 g., which will automaticaly institute the go-around mode.

The go-around mode will be defined by the above interlocks such that it will be in effect when the flight director mode selector, 100, is set to "SC" positions (automatically released by the palm switch 109 or accelerometer level detector 105) at a time when the flight director computer 54 had been operating in its glide path capture mode. When the selector is released to "SC" position, it will clamp the cursor (interlock 97) at the value corresponding to 1.3 $V_s$ at full flap (typically 50°). This value is approximately 1.2 $V_s$ at go-around flap setting (typically 23°).

If the airspeed of the airplane is less than the clamped cursor value as determined by interlock 112, a 2° nose up flight path angle command will be inserted into summation amplifier 125 through interlock 148 and operation of interlock 119. Also, the pitch limit is reduced to about 8° through interlock 150. This mode will remain in effect until $V = V_{REF}$ at which time interlock 113 will release interlock 119 and operate interlock 148 removing the $\gamma_L$ bias. The system will then operate in a mode similar to the take-off mode after capture of $V_2$.

What is claimed is:

1. In an airspeed control system for aircraft having adjustable flaps for controlling the lift characteristics of said aircraft, apparatus for computing a reference airspeed comprising,
   (a) means providing a first signal proportional to the actual angle of attack of said aircraft,
   (b) means providing a second signal proportional to a reference angle of attack of said aircraft,
   (c) means responsive to the position of said flaps for varying the value of said second signal in accordance with a predetermined stall margin program corresponding to said flap positions,
   (d) means responsive to the actual airspeed of the craft and to said first signal deriving a third signal corresponding to the weight of said aircraft and hence corresponding to its lift at unit load factor,
   (e) means responsive to said second and third signals for deriving a further signal proportional to the difference therebetween, and
   (f) means responsive to said further signal and having an output coupled to vary said third signal in a manner such as to reduce said further signal to zero, whereby said output represents a reference airspeed corresponding to said stall speed margin program.

2. In the airspeed control system apparatus as set forth in claim 1 wherein the means providing said reference angle of attack signal includes means responsive to craft bank angle for modifying said reference angle of attack signal and hence said reference airspeed in accordance with increased load factor during banked turns.

3. In the airspeed control system apparatus as set forth in claim 1 further including low pass filter means responsive to said aircraft weight signal for rendering said reference airspeed signal substantially insensitive to increases in load factor due to air turbulence.

4. In an airspeed control system for aircraft, apparatus for providing a measure of a reference airspeed corresponding to a predetermined stall margin program, dependent upon changes in the lift characteristic of said aircraft comprising,
   (a) means responsive to the existing airspeed and angle of attack of said aircraft for deriving a first signal proportional to the existing weight of said aircraft,
   (b) means responsive to the lift characteristic of said aircraft for providing a measure of a reference angle of attack corresponding to that required to maintain said predetermined stall margin program, and (c) means responsive to said weight signal and said reference angle of attack signal for providing a reference airspeed measure corresponding to said stall margin program.

5. In an airspeed control system for aiding the pilot of an aircraft during a take-off climb out maneuver, the combination comprising, (a) a flight director indicator having an indicator pointer movable relative to a reference index for commanding a change in pitch attitude, (b) means responsive to the instantaneous airspeed of said aircraft and a pre-set take-off reference airspeed for providing a first signal proportional to the difference therebetween, (c) means responsive to the flight path angle of said aircraft for providing a second signal proportional thereto, and (d) means responsive to said first and second signals for displacing said pointer in accordance with the algebraic sum thereof whereby to command a pitch attitude required to maintain said airspeed difference signal proportional to the craft's flight path angle.

6. In an airspeed control system of the character set forth in claim 5 wherein said last mentioned means includes, (a) limiting means responsive to said airspeed and flight path angle signals, said system further including (b) means providing a signal proportional to craft pitch attitude, and (c) means supplying said pitch attitude signal to both said limiting means and said pointer means whereby to limit the pitch attitude of said craft to a predetermined value independently of said airspeed and flight path angle signals.

References Cited

UNITED STATES PATENTS

| | | | |
|---|---|---|---|
| 3,200,642 | 8/1965 | Neuendorf et al. | 73—178 |
| 3,241,362 | 3/1966 | Scott | 73—178 |
| 3,295,369 | 1/1967 | Priestley | 73—178 |

DONALD O. WOODIEL, Primary Examiner

U.S. Cl. X.R.

244—77